No. 787,869. Patented April 18, 1905.

UNITED STATES PATENT OFFICE.

EDWARD GOODRICH ACHESON, OF STAMFORD TOWNSHIP, ONTARIO, CANADA, ASSIGNOR, BY MESNE ASSIGNMENTS, TO NORTH AMERICAN TRUST COMPANY, TRUSTEE, A CORPORATION OF NEW YORK.

METHOD OF MAKING REFRACTORY BODIES.

SPECIFICATION forming part of Letters Patent No. 787,869, dated April 18, 1905.

Original application filed November 20, 1902, Serial No. 132,170. Divided and this application filed December 12, 1904. Serial No. 236,607.

*To all whom it may concern:*

Be it known that I, EDWARD GOODRICH ACHESON, a citizen of the United States, residing in Stamford township, in the county of Welland, Province of Ontario, Canada, have invented certain new and useful Improvements in Methods of Making Refractory Bodies, of which the following is a specification.

In my Patent No. 722,793, issued March 17, 1903, of which the present application is a division, I have described and claimed a refractory material consisting, essentially, of silicon, oxygen, and carbon in chemical combination, suitable for use as a refractory lining for furnaces or converters or as a material for fire-bricks, crucibles, muffles, twyers, &c. This material, which I have designated "siloxicon," is very refractory at high temperatures, insoluble in iron, and inert toward both acid and basic slags and is readily shaped into any desired form of lining or article. The material is self-binding, and the use of a separate binding agent is not essential to the production of a coherent mass or article. A temporary binder may be used, more particularly with heavy or complicated articles, which should preferably be of such character or used in such proportion that its residue does not constitute an essential ingredient of the finished article and is incapable of acting as a permanent bond. The presence of a residue constituting a permanent bond is detrimental for most purposes, since a mass or article containing such residue is less refractory than siloxicon at high temperatures and in the presence of active chemical reagents.

The present invention is a method of making coherent self-bonded masses or articles of siloxicon. According to this method siloxicon is ground to the desired fineness, moistened with water, or, if the article be heavy or of complex form, with a solution of glue or with other suitable temporary binder, shaped and fired. The temperature of firing should be approximately 2,000° Fahrenheit or sufficient to develop the self-binding effect and to substantially eliminate the temporary binder.

What I claim is—

1. The method which consists in shaping a material consisting essentially of silicon, oxygen and carbon, in chemical combination, and firing it to form a coherent self-bonded mass, substantially as described.

2. The method which consists in shaping a material consisting essentially of silicon, oxygen, carbon, in chemical combination, and a temporary binder, and firing it to form a coherent self-bonded mass, substantially as described.

In testimony whereof I have signed my name to this specification in the presence of two subscribing witnesses.

EDWARD GOODRICH ACHESON.

Witnesses:
HUGH M. STERLING,
FRANK L. FREEMAN.